US008045741B2

(12) United States Patent
Yoshino

(10) Patent No.: US 8,045,741 B2

(45) Date of Patent: Oct. 25, 2011

(54) BOUNDARY MICROPHONE

(75) Inventor: Satoshi Yoshino, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 608 days.

(21) Appl. No.: 12/251,998

(22) Filed: Oct. 15, 2008

(65) Prior Publication Data

US 2009/0097686 A1 Apr. 16, 2009

(30) Foreign Application Priority Data

Oct. 16, 2007 (JP) ................................. 2007-268733

(51) Int. Cl.
*H04R 9/08* (2006.01)
*H04B 15/00* (2006.01)

(52) U.S. Cl. ....... 381/355; 381/94.1; 381/177; 381/356; 381/357; 381/358; 381/359; 381/360; 381/369

(58) Field of Classification Search ................. 381/94.1, 381/177, 355, 356, 357, 358, 360, 361, 369, 381/359

See application file for complete search history.

(56) References Cited

U.S. PATENT DOCUMENTS

| | | | | |
|---|---|---|---|---|
| 7,471,802 | B2 * | 12/2008 | Akino et al. | 381/355 |
| 7,602,931 | B2 * | 10/2009 | Akino et al. | 381/355 |
| 2005/0259842 | A1 * | 11/2005 | Akino et al. | 381/369 |
| 2006/0078149 | A1 * | 4/2006 | Akino et al. | 381/369 |
| 2008/0025532 | A1 * | 1/2008 | Yonehara et al. | 381/174 |
| 2008/0159578 | A1 * | 7/2008 | Akino et al. | 381/361 |

FOREIGN PATENT DOCUMENTS

| | | | |
|---|---|---|---|
| JP | 2005-333180 | A | 12/2005 |
| JP | 2006-148325 | A | 6/2006 |
| JP | 2008-167175 | A | 7/2008 |
| JP | 2008-187581 | A | 8/2008 |

* cited by examiner

*Primary Examiner* — Long Tran

(74) *Attorney, Agent, or Firm* — Sughrue Mion, PLLC

(57) ABSTRACT

A boundary microphone, comprising: a base made of a metal; a cover made of a metal having a plurality of holes for introducing sound waves; and internal components including a microphone unit that is disposed in an internal space enclosed by the base and the cover; a first metallic part disposed on one side of the upper and lower sides of the internal components; and a second metallic part, which is disposed on other side of the upper and lower sides of the internal components and which encloses the internal components along with the first metallic part from all directions, are provided, wherein the base, the cover, the first metallic part, and the second metallic part are alternately overlapped at their peripheral portions, and wherein at least one of the first metallic part and the second metallic part is made of a metallic mesh.

7 Claims, 2 Drawing Sheets

BOUNDARY MICROPHONE

BACKGROUND OF THE INVENTION

1. Field of the Invention

The present invention relates to a boundary microphone, and in particular to the boundary microphone characterized by its shielding structure.

2. Related Background of the Invention

A flat microphone to be installed on a desk or the like for use is an on-surface sound pickup microphone, and is called a boundary microphone or a surface mount microphone. In the present invention, a microphone of such a type is referred to as a "boundary microphone". Since the boundary microphone is intended to be installed in a low profile manner on a desk or the like, the boundary microphone is designed so as to be flat with restricted height. Usually, the boundary microphone has a structure in which a metallic part having a plurality of openings for introducing sound waves is connected, one above the other, with a metallic part for supporting a microphone unit and an electronic circuit board. The microphone unit and the electronic circuit board are disposed in a space formed by the upper and lower metallic parts.

The boundary microphone is constructed of mainly two parts, i.e., a base and a cover in appearance. Electric circuits, such as the microphone unit, the circuit board, an impedance converter, a tone control circuit, and an output circuit are incorporated into the internal space formed by the base and the cover. The base is made of a flatmetal and can be secured to a desktop or a floor surface. The cover is made of a metallic part, and has numerous openings formed therein in order to introduce sound waves to the microphone unit. For the cover, a punching metal having numerous holes formed therein by punching is often used, for example. The cover is put on the base and secured to the base with a screw.

If high frequency noise caused by electromagnetic waves enters into the above-described electric circuit from the outside, this noise is detected by a semiconductor element used in the impedance converter or the like, and is then mixed into a sound signal as a noise signal, thereby degrading the signal to noise ratio (S/N) at the microphone output. Accordingly, the connecting portions in the peripheral portions of the base 1 and the cover 2 are preferably joined together without any gap so as to shield the internal components from high frequency noise coming from the outside. The reason is, if the connecting portions are not joined together appropriately but the base and the cover are in point contact with each other and there is a gap therebetween, high frequency noise will enter from this gap.

However, the conventional boundary microphone has such a structure that the base and the cover tend to be in point contact with each other for the reason described below. Although the base is typically manufactured using a zinc die casting method or the like, the casting surface is not flat. On the other hand, for the cover, a punching metal is typically used as the material as described above, and by press molding this, the cover is formed into a desired shape. However, the peripheral portion, which is electrically and mechanically in contact with the base, is not flat and there occur irregularities. Accordingly, even if the cover is directly put on the base and is screwed thereinto, the base and the cover will be in point contact with each other.

For the electromagnetic waves of VHF and UHF bands which are used in the conventional TV broadcast and the like, the shielding effect can be exhibited even if the base and the cover are slightly in point contact with each other. However, as in recent years, when mobile phones using radio waves in a shorter wavelength region become popular, the electromagnetic waves will enter into the internal space of a microphone even when there is a very small gap, because they have a short wavelength. In addition, the mobile phone is an item which a user uses nearby, and therefore the mobile phone will be more often used near a microphone, thus creating an environment in which electromagnetic wave noise is more likely to enter into the microphone. This is true of the boundary microphone that is used in a conference room and the like.

In order to exhibit a shielding effect even if a mobile phone is used near a boundary microphone under such environmental condition, the present inventors have previously proposed a boundary microphone provided with a microphone case capable of exhibiting a sufficient shield ability against strong electromagnetic waves of a portable telephone level (see Patent Document 1). This technique is characterized in that a gasket having both elasticity and electric conductivity is disposed between a base and the peripheral end face of a cover constituting the housing of the boundary microphone.

[Patent Document 1] Japanese Unexamined Patent Application Publication No. 2005-333180

SUMMARY OF THE INVENTION

Problems to be Solved by the Invention

The invention described in Patent Document 1 aims to prevent the penetration of electromagnetic waves into the housing of a microphone by filling a gap between the cover and the base with a gasket.

However, for the peripheral portion of the cover that is made by stamping and forming a punching plate or the like in a press, it is difficult to form this into a desired shape, and irregularities will inevitably occur in the peripheral portion, and a gap occurring between the cover and the base is difficult to be filled with a gasket perfectly. It has thus been found that if a mobile phone using a high frequency electromagnetic wave, such as 2 GHz, is used close to a microphone, then with a shield structure made up of only a cover and a base as described in Patent Document 1, a satisfying shielding effect cannot be obtained even if a gasket is interposed between the cover and the base. It is thus an object of the present invention to provide a boundary microphone which can prevent the penetration of the electromagnetic wave, even if a mobile phone using a high frequency electromagnetic wave such as 2 GHz is used close to the microphone.

Means for Solving the Problems

According to the main feature of the present invention, a boundary microphone comprises a base made of a metal; a cover made of a metal having a plurality of holes for introducing sound waves; and internal components including a microphone unit that is disposed in an internal space enclosed by the base and the cover, the base and the cover being electrically connected to each other. The boundary microphone further comprises: a first metallic part disposed on one side of the upper and lower sides of the internal components; and a second metallic part which is disposed on other side of the upper and lower sides of the internal components and which encloses the internal components along with the first metallic part from all directions. Here, the base, the cover, the first metallic part, and the second metallic part are alternately overlapped at their peripheral portions, and at least one of the first metallic part and the second metallic part is made of a metallic mesh in order to introduce sound waves to the microphone unit.

It is preferable that the peripheral portions of the base, the cover, the first metallic part, and the second metallic part be overlapped with each other on the inside and outside thereof, and that the internal components be disposed in a space enclosed by the first metallic part and the second metallic part.

Advantages of the Invention

Since the internal components are disposed in the space enclosed by the base and the cover and furthermore the internal components are enclosed by the base, the cover, the first metallic part, and the second metallic part whose peripheral portions are alternately overlapped, the electromagnetic waves which are to enter toward the internal components from the outside can be blocked more effectively. For example, even if a mobile phone using a high frequency electromagnetic wave, such as 2 GHz, is used close to the microphone, it is possible to prevent the electromagnetic wave from penetrating into the internal components and also possible to prevent the occurrence of noise caused by the electromagnetic wave.

The shielding effect can be further improved by overlapping the peripheral portions of the first metallic part and the second metallic part with each other on the inside and outside thereof and by disposing the internal components in a space enclosed by the first metallic part and the second metallic part.

DESCRIPTION OF THE PREFERRED EMBODIMENTS

Hereinafter, the embodiment of the boundary microphone according to the present invention will be described with reference to the accompanying drawings.

Figure 1:
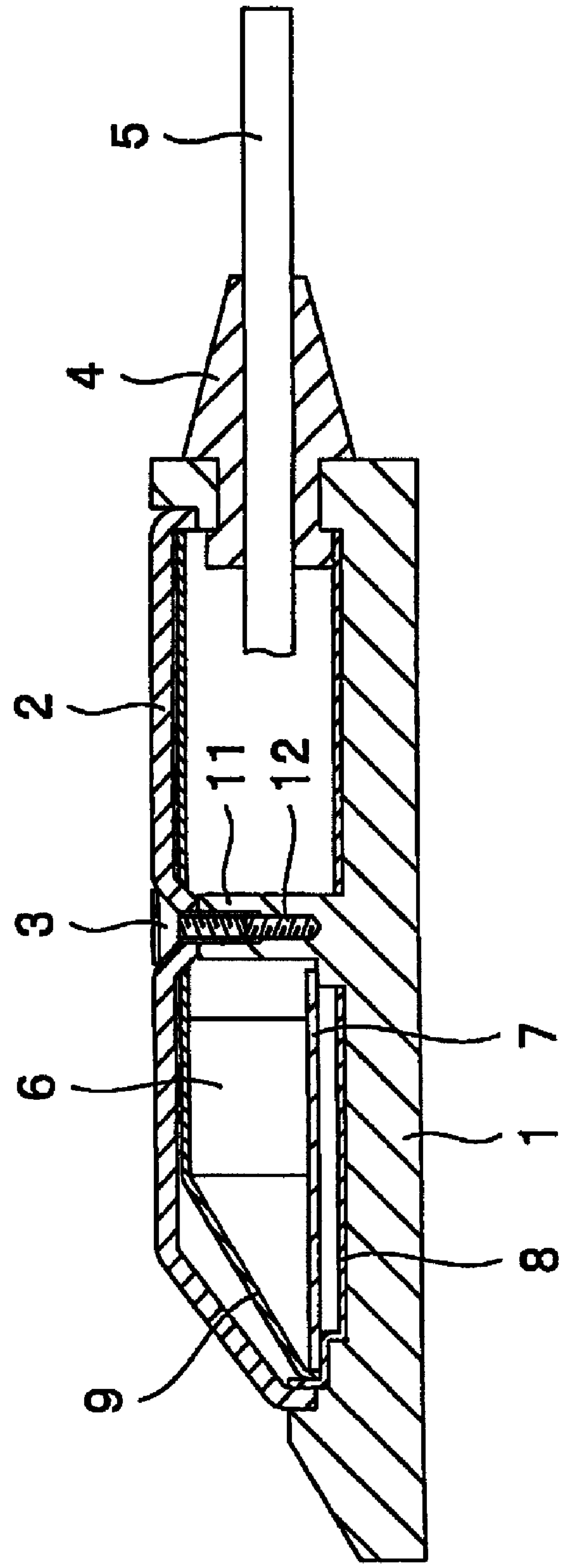
FIG. 1 is a side cross sectional view showing an embodiment of a boundary microphone according to the present invention.
Figure 2:
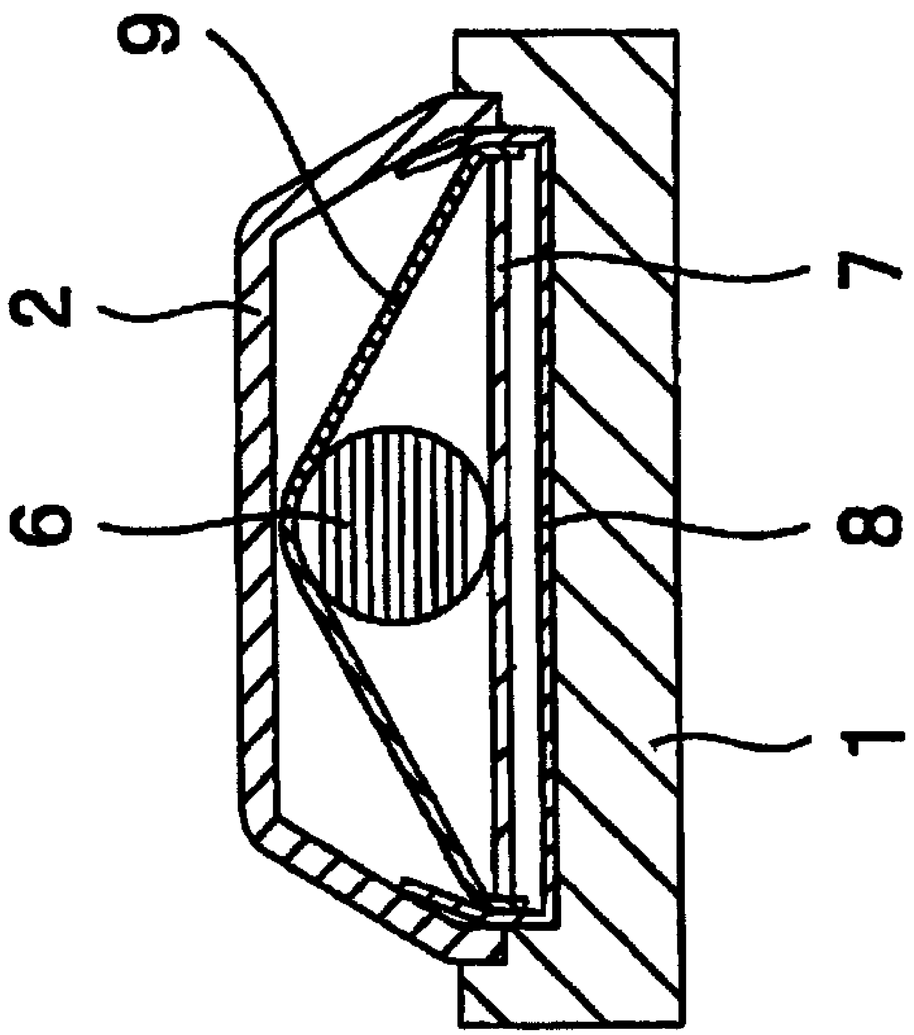
FIG. 2 is a front cross sectional view of the embodiment.

In FIG. 1 and FIG. 2, reference numeral 1 denotes a base of the boundary microphone. The base 1 is also called a boundary plate, and is made of a flat metal, and can be secured to a desk top or a floor surface. In an upper surface of the base 1, a cavity (dimple) for mounting the later-described circuit board and the like is formed. From the upper surface of the base 1, a column 11 for connecting the later-described cover 2 is erected by integral molding, approximately in the center when viewing the base 1 from the plane direction. In the column 11, a tapped hole 12 is formed from the upper end. For the base 1, the left side in FIG. 1 is the front side and the right side is the backside, and a wall is integrally formed at the back end of the base 1, and a bush 4 is fitted into a hole that is formed through this wall. In the case of a boundary microphone installed in a conference room, the boundary microphone is installed on a desk or the like with the front side facing the participants. One end of a microphone cord 5 is passed through a center hole of the bush 4. The microphone cord 5 is typically a two-core balanced output cord, and a cord, wherein the above-described cord is wrapped around with a shielding wire, is used. The end portions of the above-described two-core communication cable and shielding wire constituting the microphone cord 5 are electrically connected to a predetermined soldering land or the like on the later-described circuit board.

In the upper surface of the base 1, a circuit board 7 is secured to the approximately first half portion of the above-described cavity so as to plug the cavity. In the upper surface of the circuit board 7, a microphone unit 6 is mounted with the sound wave introducing port thereof facing forward. As the microphone unit 6, a condenser type microphone unit is used in this embodiment. The cover 2 for covering the whole upper surface of the base 1 including the microphone unit 6 and the circuit board 7 is put on the base 1. The cover 2 is made of a metallic part, as in the case of the base 1, and numerous openings for introducing sound waves to the microphone unit 6 are formed therein. As the material of the cover 2, in this embodiment, a punching metal is used, in which numerous holes are formed by punching. The cover 2 is press molded into a flat plate form, which is then inverted and put on the upper surface of the base 1. Here, the peripheral portion of the cover 2 is overlapped with the inner side of the peripheral portion of the base 1. In the cover 2, approximately in the center when viewing the cover 2 from the plane direction, a dimple is formed at a position corresponding to the column 11 of the base 1 and a hole is formed in the bottom of this dimple. A screw 3 as a fastening member is inserted into this hole, and the screw 3 is screwed into the tapped hole 12 formed in the column 11, so that the cover 2 is connected to the base 1. The head of the screw 3 sinks into the inside of the dimple of the cover 2. A receiving portion for the peripheral portion of the cover 2 is formed in the periphery of the upper surface side of the base 1, and the receiving portion is designed so that the peripheral portion of the cover 2 may abut on the base 1 while the cover 2 remains fastened to the base 1 with the screw 3 as described above.

In this way, the boundary microphone comprises mainly two parts, i.e., the base 1 and the cover 2 in appearance, and the internal components are incorporated in the internal space. The screw 3 inserted in the hole of the cover 2 is screwed into the tapped hole 12 of the base 1, and thereby the base 1 and the cover 2 are mutually connected. Since a plurality of screws 3 would be externally noticeable and look unattractive, the base 1 and the cover 2 are connected together with one screw 3 approximately in the center of the cover 2 so that the head of the screw 3 may fit into the dimple of the cover 2.

In the internal space enclosed by the base 1 and the cover 2, the electric circuits, such as the impedance converter, the tone control circuit, and the output circuit, other than the microphone unit 6 and the circuit board 7 are incorporated. If high frequency noise comprising electromagnetic waves enter into these electric circuits from the outside, this noise is detected by a semiconductor element used in the impedance converter or the like, and is then mixed into a sound signal as a noise signal, thereby degrading the signal to noise ratio (S/N) at the microphone output. Accordingly, it is preferable that the connecting portions in the peripheral portions of the base 1 and the cover 2 are joined together without any gap so as to shield the internal components from high frequency noise coming from the outside. The reason is that if these connecting portions are not joined together properly and the base 1 and the cover 2 are in point contact with each other and there is a gap therebetween, high frequency noise will enter through this gap.

However, as described in the conventional boundary microphone, the base 1 and the cover 2 tend to be in point contact with each other and thus the shielding is not perfect against the electromagnetic waves used in mobile phones and the like. Then, this embodiment employs a distinctive structure as described below, and the shielding also against the electromagnetic waves used in mobile phones and the like can be carried out perfectly.

In FIG. 1 and FIG. 2, in the space formed by the base 1 and the cover 2, a first metallic part 8 is disposed on one side of the upper and under sides of the internal components including the microphone unit 6 and the circuit component 7, while on other side of the upper and lower sides of the internal component, a second metallic part 9 that encloses the internal components along with the first metallic part 8 from all directions is disposed. In the illustrated embodiment, the first metallic part 8 is placed between the base 1 and the internal component (specifically, the circuit board 7), and the second metallic part 9 is placed between the cover 2 and the internal component (specifically, the microphone unit 6). At least one of the first metallic part 8 and the second metallic part 9, specifically the metallic part on the side for covering the microphone unit 6, accordingly, at least the second metallic part 9 in the illustrated embodiment is made of a metallic mesh in order to introduce sound waves to the microphone unit 6. Although the first metallic part 8 may be constructed of a metal plate, it may be also constructed of a metallic mesh.

The first metallic part 8 extends along the bottom face of the dimple of the base 1, and the peripheral portion of the first metallic part 8 extends along the side wall of the above-described dimple and further rises along the inner side of the peripheral portion of the cover 2. On the other hand, the peripheral portion of the second metallic part 9 is bent downward so as to be set along the inner side face of the peripheral portion of the first metallic part 8. In this way, the peripheral portion of the second metallic part 9 and the peripheral portion of the first metallic part 8 are overlapped with each other on the inside and outside thereof, and the space enclosed by the first metallic part and the second metallic part is formed, and in this space the above-described internal components are disposed. The side faces of the circuit board 7 are positioned against the above-described overlapping portions in the peripheral portions of the first metallic part 8 and the second metallic part 9 so as to press the peripheral portion of the second metallic part 9, which is one of the metallic parts, against the peripheral portion of the first metallic part 8, which is the other metallic part.

In this way, in the first metallic part 8 and the second metallic part 9, their peripheral portions are alternately overlapped on the inside and outside thereof. The overlapping portions of the first metallic part 8 and the second metallic part 9 correspond to the overlapping portions of the base 1 and the cover 2, whereby the peripheral portions of the base 1, the cover 2, the first metallic part 8, and the second metallic part 9 are alternately overlapped on the inside and outside thereof. In the illustrated embodiment, from the inside toward the outside, in the order of the base 1, the cover 2, the first metallic part 8, and the second metallic part 9, their peripheral portions are overlapped with each other. By providing such configuration, an opening in the overlapping portion of each of the above-described members is made small so as to make it difficult for electromagnetic waves to penetrate into the internal space, thereby increasing the shielding effect.

As already described, approximately in the center when viewed from the plane direction, the cover 2 and the base 1 include a fastening portion that is fastened by one screw 3. The first metallic part 8 and second metallic part 9 have a relief hole for a coupling portion at a position corresponding to the above-described fastening portion. The second metallic part 9 has a relief hole corresponding to the position of the dimple of the cover 2. However, the relief hole catches on a tapered projection that projects on the back side of the dimple of the cover 2, or the peripheral portion of the relief hole is sandwiched between the lower end face of the tapered projection and the upper end face of the column 11 of the base 1, and thereby the second metallic part 9 is electrically conducted to the cover 2 at the fastening portion of the cover 2 and the base 1. The first metallic part 8 has a relief hole for the column 11 of the base 1. However, the first metallic part 8 as a whole is in surface contact to the cavity of the base 1, and is pressed by the peripheral portion of the circuit board 7 via the second metallic part 9, and furthermore the peripheral portion of the first metallic part 8 is pressed downward by a force fastening the cover 2 to the base 1 with screw 3, and thereby the first metallic part 8 is directly crimped to the base 1. In this way, the first metallic part 8 is electrically conducted to the base 1, and as a result, the base 1, the cover 2, the first metallic part 8, and the second metallic part 9 are electrically integrally connected to each other.

The second metallic part 9, and furthermore the metallic mesh forming the first metallic part 8 need to have properties which allow sound waves to pass therethrough and which block the passage of electromagnetic waves. As the material having such properties, #80 stainless steel mesh having 0.1 mm in diameter is used in this embodiment.

According to this embodiment described above, since the internal components are disposed in the space enclosed by the base 1 and the cover 2 and furthermore the internal components are enclosed by the first metallic part 8 and the second metallic part 9, it is possible to more effectively block the electromagnetic waves which are to enter toward the internal components from the outside. Accordingly, even if a mobile phone using a high frequency electromagnetic wave, such as 2 GHz, is used close to the microphone, it is possible to prevent the electromagnetic wave from penetrating into the internal components, and also possible to prevent the occurrence of noise caused by the electromagnetic wave.

Moreover, according to the illustrated embodiment, the shielding effect can be further improved by overlapping the peripheral portions of the first metallic part 8 and the second metallic part 9 with each other on the inside and outside thereof and disposing the internal components in the space enclosed by the first metallic part 8 and the second metallic part 9.

Since the side face of the circuit board 7 presses one of the metallic parts against the other metallic part at the overlapping portion in the peripheral portions of the first metallic part 8 and the second metallic part 9, both the metallic parts can be electrically integrated reliably, so that the shielding effect can be improved further.

Furthermore, there is an additional advantage,that since the base 1, the cover 2, the first metallic part 8, and the second metallic part 9 are electrically integrally connected to each other, the shielding effect can be improved also from this point.

What is claimed is:

1. A boundary microphone, comprising: a base made of a metal; a cover made of a metal having a plurality of holes for introducing sound waves; and internal components including a microphone unit that is disposed in an internal space enclosed by the base and the cover, the base and the cover being electrically connected to each other, the boundary microphone further comprising:

a first metallic part disposed on one side of the upper and lower sides of the internal components; and a second metallic part which is disposed on other side of the upper and lower sides of the internal components and which encloses the internal components along with the first metallic part from all directions, wherein the base, the cover, the first metallic part, and the second metallic part are alternately overlapped at their peripheral portions, and wherein at least one of the first metallic part and the second metallic part is made of a metallic mesh in order to introduce sound waves to the microphone unit.

2. The boundary microphone according to claim 1, wherein the peripheral portions of the base, the cover, the first metallic part, and the second metallic part are overlapped with each other on the inside and outside thereof, and wherein the internal components are disposed in a space enclosed by the first metallic part and second metallic part.

3. The boundary microphone according to claim 2, wherein in an overlapping portion of the peripheral portions of the first metallic part and the second metallic part, a side face of a circuit board presses one of the metallic parts against the other metallic part.

4. The boundary microphone according to claim 1, wherein the first metallic part is located between the base and the internal components, and the second metallic part is located between the cover and the internal components, and wherein at least the second metallic part is made of a metallic mesh.

5. The boundary microphone according to claim 4, wherein the first metallic part is directly crimped to the base.

6. The boundary microphone according to claim 4, wherein in a state where the cover is put on the base, one screw extends through a center of the cover and is screwed into the base and thereby the cover is fastened to the base, and wherein the second metal member has a hole in a fastening portion of the cover and the base.

7. The boundary microphone according to claim 6, wherein the second metallic part is electrically connected to the cover at the fastening portion of the cover and the base.

* * * * *